Patented Jan. 30, 1945

2,368,126

UNITED STATES PATENT OFFICE 2,368,126

FINISHING COMPOSITION AND METHOD OF MAKING

Jacob M. Fain, Belle Harbor, N. Y., assignor to Foster D. Snell, Inc., Brooklyn, N. Y., a corporation of New York No Drawing. Application October 29, 1941, Serial No. 416,994

7 Claims. (Cl. 260—19)

This invention relates to a finishing composition and the method of making it, and particularly to a composition for use on floors.

Shellac has long been used in finishes for wood floors. Applied ordinarily in alcohol solution, the shellac penetrates well into the wood, fills the pores, and hardens quickly. The alcohol used introduces an objectionable fire hazard, inasmuch as the closed cup flash point of ethyl alcohol is below 60° F. Also, the resulting film is subject to whitening and softening when exposed to water.

The present invention provides a composition that preserves desirable properties of shellac in floor finishes, greatly reduces the fire hazard in the composition to be applied, and eliminates the whitening and softening of the film of finishing material when contacted with water.

The invention comprises dissolving shellac by heating it with the product of heating a fatty drying oil with a metal oxide of which lime is an example, to make a product that is soluble in hydrocarbon solvents of high flash point, and adding a paint oil drier, a volatile solvent, and a minor proportion of a water-resistant varnish.

The shellac used should be bleached white shellac when a finish of little coloring power is desired, as is usually the case. Otherwise, a more deeply colored shellac may be used.

The fatty drying oil to be used should be one that in film form dries rapidly in the presence of a paint oil drier and that has the power when heated to dissolve lime or like metal compound to be described later. Thus, there may be used to advantage linseed, oiticica, or perilla oils.

There is used a metal compound, such as lime, which is heated with the fatty drying oil before the shellac is incorporated. In place of lime for this purpose, there may be used another oxide of a multivalent metal and preferably of a bivalent metal, the oxide selected being one adapted to dissolve in the drying oil on heating. Presumably the dissolving involves saponification of at least a substantial part of the drying oil, the invention not being limited, however, to any theory of explanation of the effect of the metal oxide.

Metal oxides that may be used in place of the lime are the following: litharge (PbO), zinc oxide, barium oxide, magnesium oxide, and strontium oxide. These oxides are known to be substantially ineffective as accelerators of oxidation of drying oils.

To increase the water resistance of the film of finishing material of the present invention, there is added a minor proportion of a water-resistant varnish of which examples are the following: a phenol-formaldehyde and China-wood oil varnish, made by kettling phenol-formaldehyde resin with China-wood oil, the proportions being suitably such as to make a short oil varnish; a varnish including a drying-oil-acid-modified alkyd resin; and paracumarone indene resin in China-wood oil.

There are shown in the following table proportions of the several materials that are satisfactory and also those that give the best results and are therefore preferred, proportions here and elsewhere herein being expressed as parts by weight.

| Ingredient | Proportions used, parts for 100 parts of film-forming ingredients | |
|---|---|---|
| | Satisfactory | Preferred |
| Drying oil | 60–75 | 62–66 |
| Lime or other metal oxide [1] | 1–5 | 1.4–2 |
| Shellac | 25–40 | 30–35 |
| Water resistant varnish | 1–5 | 1.2–2 |
| Volatile solvent | (²) | (²) |

[1] The proportions of metal oxides are expressed in terms of the amount equivalent theoretically as saponification agents to calcium oxide in the proportions shown. The range of actual proportions for litharge, for example, is four times that for lime, or 4 to 20, four being the approximate ratio of the equivalent weights of litharge and lime.

² As required for desired consistency.

As to the proportion of solvent to be used, this will vary with the method by which the finishing composition is to be applied to a floor or the like. For a composition to be applied by brushing, the solvent should be in proportion to give the viscosity or consistency that is conventional in floor finishing compositions for application with a brush. Thus, there may be used to advantage solvents in proportion of about 2 to 4 parts for one part of film-forming ingredients, 2.5 to 3 parts of the solvent being a preferred proportion.

In compounding the ingredients in making the finishing composition, the drying oil is mixed with the lime or other metal oxide selected and heated to a temperature causing solution of the oxide, the heating being effected at a temperature between 225° and the temperature at which the oil alone is known to decompose at such a rate as to introduce objectionable amounts of decomposition products. This maximum temperature is around or moderately above 300° C.

Particularly good results have been obtained when the lime or other metal oxide is heated with the linseed oil at a temperature between 250° and 290° C., the heating preferably being begun in the lower part of the range, the temperature raised gradually and the heating finished at about 290°. Heating is continued sufficiently long to effect solution of the metal oxide. Ordinarily there is required about 1 to 2 hours for this solution to occur at temperatures within the range stated, the time required being somewhat shorter the higher the temperature.

After the metal oxide has been dissolved, either as such or in the form of a soap or other new metal compound, in the drying oil, then there is added the shellac. The shellac is suitably added a little at a time and the whole mixture kept in agitation, the temperature during the addition and until the shellac dissolves being maintained at a point such as to make solution of the shellac satisfactorily rapid but not such as either to decompose the oil to an objectionable extent or to cause conversion of the shellac to a gummy insoluble product. Suitably the mixture is maintained at a temperature of 250° to 305° C. during the dissolving of the shellac, the temperature of heating with the shellac being important if satisfactory results are to be obtained. For commercial operations temperatures of heating of the shellac with the treated drying oil should be approximately within the range 270° to 305° C. and for best results about 290° to 305° C. When such a range of temperatures is used, the shellac dissolves readily without becoming overheated so as to give an undesirable, undissolved gummy mass. For temperatures in the range 290° C. to 305° C., the period of heating of the shellac with the drying oil that has been treated with lime or the like is about 2 to 4 hours, the exact time varying somewhat with the size of the batch and thoroughness of agitation provided and the heating time being made about as short as possible for complete solution.

The product made by heating the drying oil with lime or other metal oxide and then heating the treated oil with shellac is cooled to temperatures below or near the boiling point of the solvent to be added, so as to avoid difficulty in the incorporation of the solvent. There are then added a conventional paint oil drier, a solvent of the kind described, and also a minor proportion of the water-resistant varnish in case resistance to water on long exposure is desired. The whole is then stirred into what seems to be a substantially uniform solution.

In such a composition the paint oil drier serves to accelerate drying of the film of finishing material after application to wood or the like. In case speed of drying is not desired, the drier may be omitted.

The invention will be further illustrated by specific examples of making the new finishing composition in form adapted for use on floors.

*Example I*

Two hundred parts of linseed oil of grade known as Kellogg's Varnish Oil are heated to 250° C. and 5 parts of lime are gradually added. The temperature is maintained at approximately 250° until visible signs of action disappear and the lime has gone into solutions. The temperature is then raised to 290° C.

One hundred parts of bleached white shellac of the grade known as Zinsser's Vac Dry are then introduced gradually while the mixture is maintained within the range 290° to 305° C. Frothing occurs. When the frothing has subsided, heating is continued until a drop of the material remains clear after being removed from the batch and cooled on a glass plate, this test showing that the shellac has dissolved properly.

The resulting product of kettling the shellac with the lime-treated oil is cooled and, during the cooling, there is then added for 100 parts of the kettled mixture, 250 parts of high flash naphtha, 1.5 parts of paint oil drier, and 18 parts of a phenol-formaldehyde varnish in China-wood oil of 12.5 gallons length. As the paint oil drier, there is used in this example 2 parts of a 24% lead drier to 1 part of a 6% cobalt drier.

The above materials when thoroughly mixed in the proportion described produce a floor finish containing not less than the 28% of solids (film-forming ingredients), which is a requirement of the Maple Flooring Manufacturers' Association for a heavy duty floor finish, and meet also other requirements of the association for this type of finish.

*Example II*

A floor finish of higher solids content is produced as follows:

One thousand parts of linseed oil of kind known as Kellogg's Varnish Oil are heated to 250° C. and 25 parts of lime are gradually added and stirred in. The temperature is maintained at about this point until reaction stops and the lime has gone into solution. The temperature is then raised to 290° C. Then 375 parts of shellac are added gradually, the mixture being maintained during this addition within the range 290° to 305° C. When the resulting frothing has subsided, heating is continued until a drop tested as above remains clear on a cold glass plate.

The kettled mixture is then cooled approximately to or below the boiling point of high flash naphtha and such naphtha is then incorporated in the proportion of 150 parts to 100 parts of the kettled oil and shellac mixture. As the high flash naphtha, there was used Neville's 250 W grade. At this time also there are added 12.5 parts of a phenol-formaldehyde varnish in China-wood oil of 12.5 gallons length and 1.5 parts of a paint oil drier containing 1 part of 24% lead drier to 2 parts of a 6% manganese drier.

This finishing material, when compounded and thoroughly mixed in the proportion described, contains not less than 40% of solids (film-forming ingredients) and thus meets this requirement of the Maple Flooring Manufacturers' Association for a gymnasium type finish.

In the place of the high flash naphtha used in the above examples, there may be used as the volatile solvent v.m. & p. naphtha, a petroleum distillate known in the paint industry as Varnolene, toluene, xylene, or the like. Shellac which is normally insoluble in these solvents has been converted by heating with the drying oil material to a new condition or a new compound in which ready solubility in the hydrocarbon solvents is obtained.

In the compositions described above, hardness and abrasion resistance may be increased by replacing a part, say 5 to 50 per cent of the total, of the kettled drying oil and shellac composition with an approximately equal weight of a phenol-formaldehyde resin or other hard hydrocarbon-soluble synthetic resin.

It will be understood that certain details given are for the purpose of illustration and that variations therefrom may be made without departing from the scope of the invention.

What is claimed is:

1. A finishing composition comprising the product of reaction of shellac with a solution in a fatty drying oil of a bivalent metal oxide that is soluble in hot drying oils and substantially ineffective as an accelerator of oxidation thereof, a paint oil drier, and a volatile solvent for the product of reaction, the ingredients of the said product being used in about the following proportions by weight for 100 parts of film forming material in the said composition: shellac 25 to 40 parts, drying oil 60 to 75 parts, and bivalent metal oxide in amount equivalent theoretically as a saponification agent to 1 to 5 parts of calcium oxide.

2. The method of making a finishing material which comprises heating approximately 60 to 75 parts of a fatty drying oil, at a temperature between about 225° C. and the temperature of objectionable decomposition of the oil, with an oxide of a bivalent metal in amount equivalent as a saponifying agent theoretically to 1 to 5 parts of calcium oxide until the oxide of the bivalent metal dissolves, heating the product with approximately 25 to 40 parts of shellac at a temperature of about 250° to 305° C. until the shellac dissolves, and forming a mixture of the resulting material with approximately 1 to 5 parts of a varnish, a minor proportion of a paint oil drier, and a volatile solvent for the said material and varnish the varnish including a resin modified with a fatty drying oil acid compound.

3. The method of making a finishing material which comprises heating 60 to 75 parts of a fatty drying oil, at a temperature of about 225° to 305° C., with an oxide of a bivalent metal in amount equivalent as a saponifying agent theoretically to 1 to 5 parts of calcium oxide, heating the product with 25 to 40 parts of shellac at a temperature of about 250 to 305° C., and forming a mixture of the resulting material with 1 to 5 parts of a varnish, a minor proportion of paint oil drier, and a volatile hydrocarbon solvent for the said material and varnish, all proportions given being approximate, and the said varnish including a resin modified with a fatty drying oil acid compound.

4. The method of making a finishing material adapted to form a hard water-resistant film which comprises heating linseed oil with calcium oxide at a temperature of about 250° to 290° C. until the calcium oxide dissolves, heating the product with shellac at a temperature of about 290° to 305° C. until the shellac dissolves, and then mixing the resulting material with a phenol-formaldehyde resin and China-wood oil varnish, a paint oil drier, and a volatile solvent for the said material and varnish.

5. A finishing composition comprising (1) the reaction compound of approximately 60 to 75 parts of a fatty drying oil, an oxide of a bivalent metal in amount equivalent theoretically as a saponifying agent to approximately 1 to 5 parts of calcium oxide, and 25 to 40 parts of shellac, (2) 1 to 5 parts of a varnish including a resin modified with a fatty drying oil, (3) a small proportion of a paint oil drier, and (4) a volatile hydrocarbon solvent for the said reaction compound and varnish, the bivalent metal oxide being soluble in hot drying oils and substantially ineffective as an accelerator of the oxidation of drying oils.

6. A finishing composition comprising (1) the oil soluble reaction product of a fatty drying oil, lime in the proportion of 1 to 5 parts for 60 to 75 parts of the drying oil, and shellac, in the proportion of 25 to 40 parts for 60 to 75 parts of the drying oil, (2) a paint oil drier, (3) a phenol formaldehyde resin and oil varnish in amount not substantially in excess of 5 parts for 60 parts of the said drying oil, and (4) a volatile solvent for the said product and varnish.

7. A method of making a finishing composition adapted to form a hard-water-resistant film which comprises heating a drying oil with an oxide of a bivalent metal that is soluble in hot drying oils and substantially ineffective as an accelerator of oxidation of drying oils, until the original undissolved oxide dissolves, then adding shellac and heating the resulting mixture until frothing subsides and the resulting material remains clear after cooling, then incorporating a paint oil drier, and dissolving the said material in a volatile solvent.

JACOB M. FAIN.